(12) United States Patent
Rao

(10) Patent No.: US 10,954,738 B2
(45) Date of Patent: *Mar. 23, 2021

(54) DUAL COMPACT CUTTING DEVICE INTERVENTION SYSTEM

(71) Applicant: WORLDWIDE OILFIELD MACHINE, INC., Houston, TX (US)

(72) Inventor: Reddi Udaya Bhaskara Rao, Singapore (SG)

( * ) Notice: Subject to any disclaimer, the term of this patent is extended or adjusted under 35 U.S.C. 154(b) by 4 days.

This patent is subject to a terminal disclaimer.

(21) Appl. No.: 16/246,834

(22) Filed: Jan. 14, 2019

(65) Prior Publication Data

US 2019/0145214 A1    May 16, 2019

Related U.S. Application Data

(63) Continuation-in-part of application No. 15/806,919, filed on Nov. 8, 2017, now Pat. No. 10,655,421, which is a continuation-in-part of application No. 15/647,490, filed on Jul. 12, 2017, now Pat. No. 10,316,608, which is a continuation of application No. 14/518,404, filed on Oct. 20, 2014, now Pat. No. 9,732,576.

(60) Provisional application No. 62/669,536, filed on May 10, 2018, provisional application No. 62/650,710, filed on Mar. 30, 2018, provisional application No. 62/650,688, filed on Mar. 30, 2018.

(51) Int. Cl.
*E21B 33/06* (2006.01)
*E21B 29/08* (2006.01)
*F16K 3/02* (2006.01)

(52) U.S. Cl.
CPC ............ *E21B 33/063* (2013.01); *E21B 29/08* (2013.01); *F16K 3/029* (2013.01)

(58) Field of Classification Search
CPC ............. Y10T 83/9447; Y10T 83/0581; Y10T 83/0596; F16K 3/029; E21B 33/06–064; E21B 29/08; E21B 29/00
USPC ........ 166/55, 85.4, 297, 298, 361, 364, 379, 166/387, 363
See application file for complete search history.

(56) References Cited

U.S. PATENT DOCUMENTS

| | | |
|---|---|---|
| 3,561,526 A | 2/1971 | Williams, Jr. et al. |
| 4,081,027 A | 3/1978 | Nguyen |
| 5,515,916 A | 5/1996 | Haley |

(Continued)

FOREIGN PATENT DOCUMENTS

| | | |
|---|---|---|
| WO | 2006/048669 | 5/2006 |
| WO | 2007/122365 | 11/2007 |

(Continued)

*Primary Examiner* — George S Gray
(74) *Attorney, Agent, or Firm* — Kenneth L. Nash; Thomas D. Nash

(57) ABSTRACT

An intervention package for servicing a subsea well has an emergency disconnect package mountable to a riser and a lower riser package connectable to the subsea well. One or more compact cutting devices are utilized on the lower riser package. The intervention package can be used without a BOP. The compact cutting device has a throughbore going through the body that is connectable to the wellbore. Mounted in the body are two gates that are continuously in contact with each other. Each gate has a blank portion and an opening. For each gate, a piston and piston chamber are on the opposite side of gate from the bore that goes through the body.

20 Claims, 11 Drawing Sheets

(56)  References Cited

U.S. PATENT DOCUMENTS

| | | | |
|---|---|---|---|
| 6,173,770 B1 | 1/2001 | Morrill | |
| 6,357,529 B1 | 3/2002 | Kent et al. | |
| 6,601,650 B2 | 8/2003 | Sundararajan | |
| 8,353,338 B2 | 1/2013 | Edwards | |
| 8,740,174 B2 | 6/2014 | Juda et al. | |
| 8,800,954 B2 | 8/2014 | Edwards | |
| 9,732,576 B2 | 8/2017 | Rao | |
| 2003/0029619 A1* | 2/2003 | Sundararajan | E21B 33/063 166/361 |
| 2006/0113501 A1 | 6/2006 | Isaacks | |
| 2010/0071913 A1* | 3/2010 | Edwards | F16K 3/029 166/387 |
| 2010/0218955 A1 | 9/2010 | Hart | |
| 2014/0034316 A1 | 2/2014 | Larson | |
| 2016/0102518 A1 | 4/2016 | Araujo | |
| 2016/0108694 A1* | 4/2016 | Rao | E21B 33/063 166/55 |
| 2016/0138356 A1 | 5/2016 | Ellison | |
| 2017/0328165 A1 | 11/2017 | Rao | |

FOREIGN PATENT DOCUMENTS

| | | |
|---|---|---|
| WO | 2012/000098 | 1/2012 |
| WO | 2014/144792 | 9/2014 |

* cited by examiner

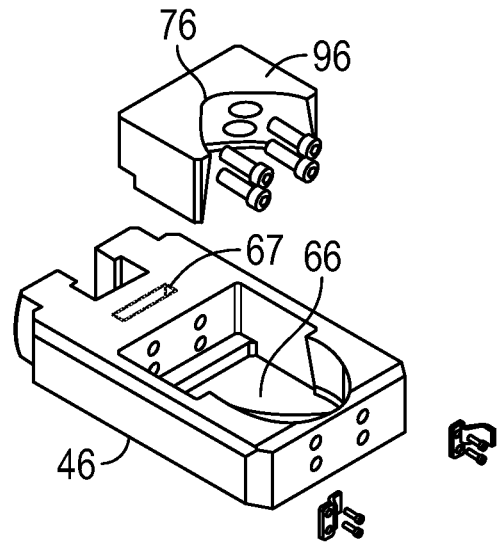
FIG. 7A
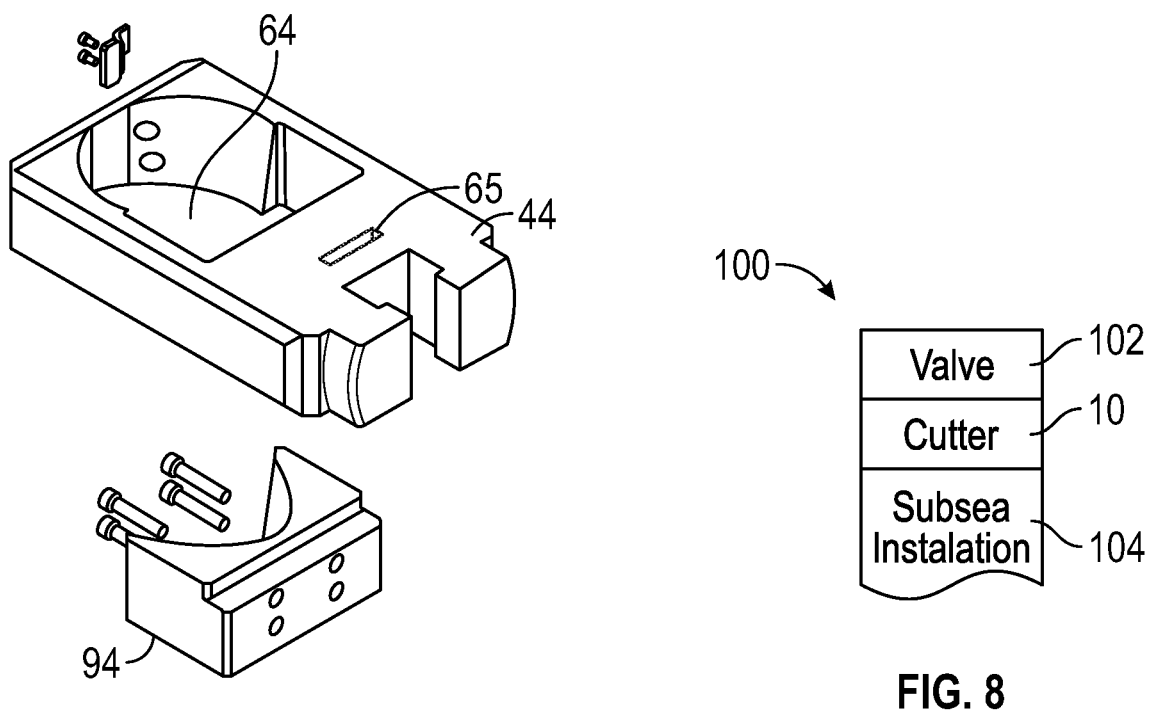
FIG. 7B
FIG. 8

DUAL COMPACT CUTTING DEVICE INTERVENTION SYSTEM

BACKGROUND OF THE INVENTION

Field of the Invention

The present invention relates generally to cutting devices or systems and, more particularly, to a cutting device or system operable for repeatedly cutting drill pipe, tubing, coiled tubing, and/or wireline so as to be especially suitable for use in a lightweight intervention package and/or in substitutions for replacing at least one BOP in an intervention package.

Background of the Invention

Blowout Preventer (B.O.P.) stacks are frequently utilized in oilfield wellbore Christmas trees and subsea intervention operations such as, for instance, lower riser packages in offshore wells. B.O.P. stacks may include a first set of rams for sealing off the wellbore and a second set of rams for cutting pipe such as tubing, wireline and/or intervention tools. However, B.O.P. stacks are quite bulky and heavy, which are undesirable features especially in lower riser packages for undersea operation where space and weight is often at a premium. B.O.P. stacks tend to be expensive for installation and removal due to the need for heavy lifting equipment. Moreover, if maintenance is required, then the high maintenance costs for utilizing B.O.P. stacks for intervention purposes severely limits the wells that can be economically reworked. B.O.P. stacks may frequently require maintenance after cutting pipe. For instance, the cut pipe may become stuck within the B.O.P. stack blocking other operations.

Consequently, those skilled in the art will appreciate the present invention that addresses the above problems.

The following patents discuss background art related to the above discussed subject matter:

U.S. Pat. No. 6,601,650, issued Aug. 5, 2003, to A. Sundararajan, which is incorporated herein by reference, discloses apparatus and methods for replacing a BOP with a gate valve to thereby save space, initial costs, and maintenance costs that is especially beneficial for use in offshore subsea riser packages. The method provides a gate valve capable of reliably cutting tubing utilizing a cutting edge with an inclined surface that wedges the cut portion of the tubing out of the gave valve body. A method and apparatus is provided for determining the actuator force needed to cut the particular size tubing.

U.S. Pat. No. 8,353,338, issued Jan. 15, 2013, to J. Edwards, discloses a well bore control valve comprising a housing defining a throughbore, the throughbore adapted to receive a first tubular. The valve further comprises first and second gates located within the housing, the gates being movable in different directions transverse to the throughbore between the throughbore open position and the throughbore closed position. Movement of the gates from the throughbore open position to the throughbore closed position, in use, shares a tubular located between the gates. The valve also comprises a first seal seat performing a seal of one of the gates in the throughbore closed position to seal the throughbore.

U.S. Patent Application No. 20100218955 discloses an oil field system comprising a main body having a bore therethrough, the main body having a connection at one end of the bore for, in use, connecting the main body to an existing wellhead, tree or other oil field equipment, a transverse cavity through the bore, the cavity having at least one opening to the outside of the main body, a plurality of flow control systems for insertion, at different times, into the cavity in order to selectively control fluid flow through the bore, wherein the plurality of flow control systems includes a gate valve and drilling BOP rams.

The above prior art does not disclose a precise cutting system of the present invention using asymmetrical operation of the gates. Consequently, those skilled in the art will appreciate the present invention that addresses the above and/or other problems.

SUMMARY OF THE INVENTION

An object of the present invention is to provide an improved intervention package without the need of a heavy BOP.

Another possible object of the present invention is to substitute a lightweight and compact CCD for the heavy BOP.

These and other objects, features, and advantages of the present invention will become clear from the figures and description given hereinafter. It is understood that the objects listed above are not all inclusive and are only intended to aid in more quickly understanding the present invention, not to limit the bounds of the present invention in any way.

One general aspect comprises an intervention package for servicing a subsea well through a riser, the intervention package comprising: a lower riser package connectable to the subsea well. The intervention package also comprises an emergency disconnect package mountable to the riser and to the lower riser package. The intervention package also comprises the emergency disconnect package being separable from the lower riser package and at least one compact cutting device mounted on the lower riser package.

The compact cutting device comprises a body defining a bore through the body, the bore being operable to receive a pipe, two gates mounted in the body, each gate comprising a blank portion and an opening, the two gates being continuously slidable with each other between an open position and a closed position, in the closed position the two gates cooperating to cut a pipe when the pipe is present, each gate being connected to a piston, a piston chamber for each gate on an opposite side of the piston from the gate, and each gate being responsive to hydraulic pressure in each the piston chamber to move each the gate to the closed position. The intervention package also comprises the intervention package being constructed without a BOP.

Implementations may include one or more of the following features: the intervention package further comprise a second compact cutting device mounted on the lower riser package.

The intervention package may comprise the compact cutting device weighs less than 13000 pounds.

The intervention package is less than twenty five feet in height from a connection to the subsea well beneath the lower riser package to a connection to a riser above the emergency disconnect package.

The lower riser package comprises a height less than ten feet. The BOP comprises a throughbore and two cutters moveable between an open position and a closed position. In the open position the two cutters being on opposite sides from each other with respect to the throughbore and in the closed position the cutters engaging each other in the throughbore.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 7A is an enlarged view of a gate in accord with one possible embodiment of the present invention.

FIG. 7B is an enlarged view of a gate oriented in a reversed position with respect to FIG. 7A in accord with one possible embodiment of the present invention.

FIG. 8 is a schematic view of a compact cutter and gate valve that may be utilized in a subsea installation is place of at least one BOP (blowout preventer) in accord with one possible embodiment of the present invention.

DETAILED DESCRIPTION OF THE INVENTION

Detailed descriptions of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Abbreviations include the following:
API—American Petroleum Institute
DNV—Det Norske Veritas (The Norwegian Veritas)
ISO—International Standardization Organization
ROV—remotely operated vehicle
NACE—National Association of Corrosion Engineers
QTC—Qualification Test Coupon The use of CCD 10 complies with codes and standards including:
API 6A, Specification for wellhead and Christmas tree equipment, 20th Edition, October 2010;
API 16A, Specification for Drill-through equipment, 3rd Edition, June 2004;
API 16D Control Systems for Drilling Well control Equipment, 2nd Edition, July 2004;
NORSOK D-002, Well intervention equipment, Revision 2, June 2013;
DNV-OS-E101, Drilling Plant, October 2013;
ISO 13533, Drilling and production equipment—Drill-through equipment, 1st Edition, December 2001;
API 17G, Recommended practice for completion/workover risers, $2^{nd}$ Edition, July 2006
NACE MR0175/ISO 15156, Petroleum and natural gas industries—materials for use in H2S—containing environments in oil and gas production, 2nd Edition, October 2009.

Figure 1:
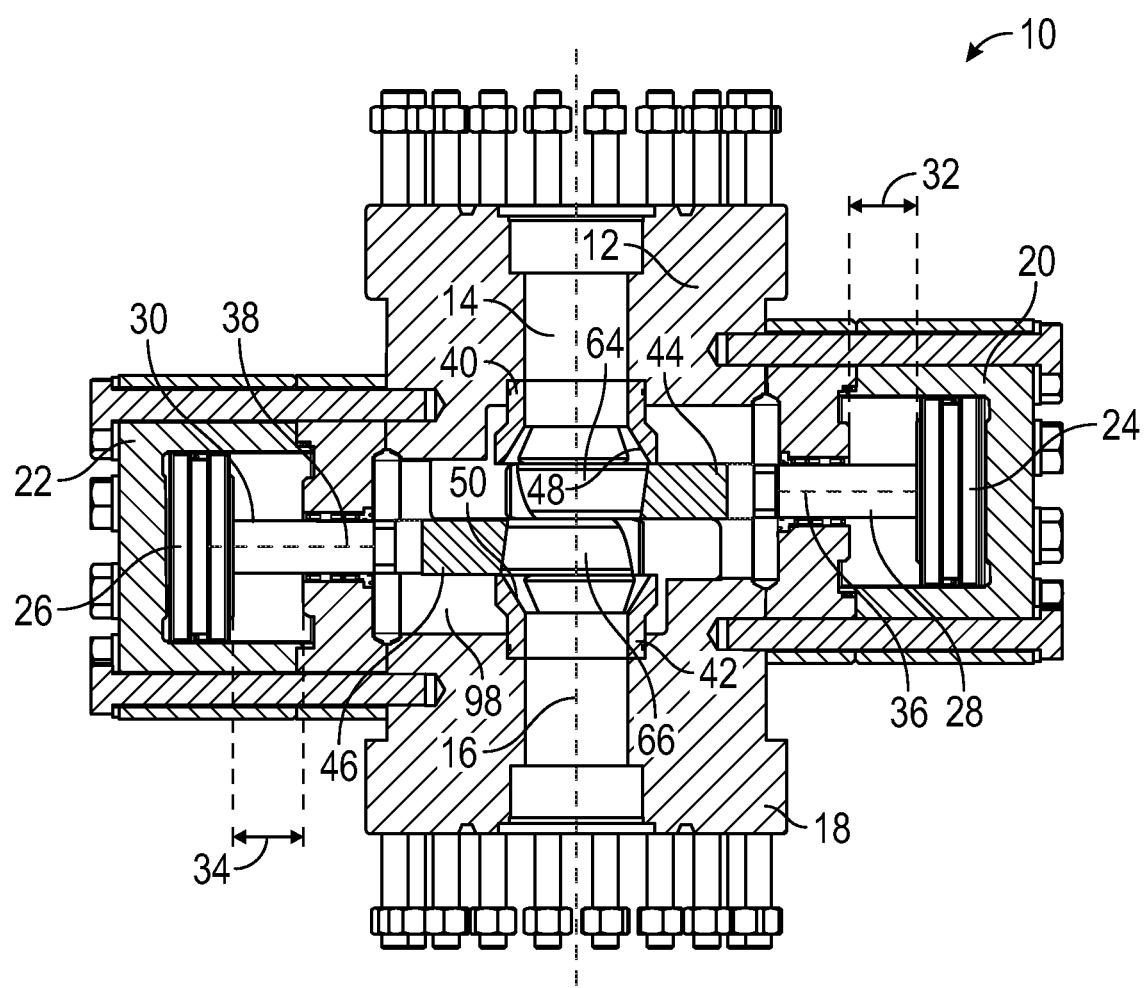
FIG. 1 is a front elevational view, in section, of a compact cutting system in the open position in accord with one possible embodiment of the present invention.

Referring now to the drawings and more particularly to FIG. 1, there is shown one possible embodiment of a compact cutting device or system which may be referred to herein as CCD 10. Housing 12 defines throughbore 14 with axis 16. Flange connection 18 at the bottom end, which may comprise studs or the like, may be utilized for connection with well equipment such as subsea installations, well intervention equipment, and the like. Another flange connection at the top end may connect to other well equipment such as a gate valve or the like. One embodiment of CCD 10 comprises a 7⅜ inch throughbore, with a 10K psi pressure rating. The top and bottom connectors may comprise a 13⅝ inch 10K psi studded connectors and/or flange connections. In one embodiment, CCD 10 is operable to cut pipe 68 (see FIG. 9) which may comprise 3½ in 13.3 lb/ft Grade E 75 drill pipe (Table 18, API 16A/ISO 13533) without leaving any snag or slug after cutting.

In fact, tests have shown that CCD 10 has successfully cut 5" OD pipe with ⅜" wall thickness and a yield strength of 132 Ksi. The CCD has also cut 2.5" solid bars, which is a difficult test of a pipe cutter.

In one embodiment, CCD 10 operates very quickly and can cut the drill string in less than 2 seconds when using an accumulator. The tests to be conducted for CCD 10 for use in an intervention package include NORSOK D-002 (API 16A/ISO 13533 Annex C) in one possible embodiment for cutting only, without the need for sealing tests as explained hereinafter. Further in one embodiment, CCD 10 weighs less than 12,000 pounds. Accordingly, the present invention may also weigh less than 30,000 or 40,000 or other amounts above 12,000. Combined with a gate valve, the combination is much less than the weight of a BOP, which provides an opportunity for a highly desirable substitution in an intervention package. The light weight makes possible reworking of wells much less expensive than using a BOP.

Figure 2:
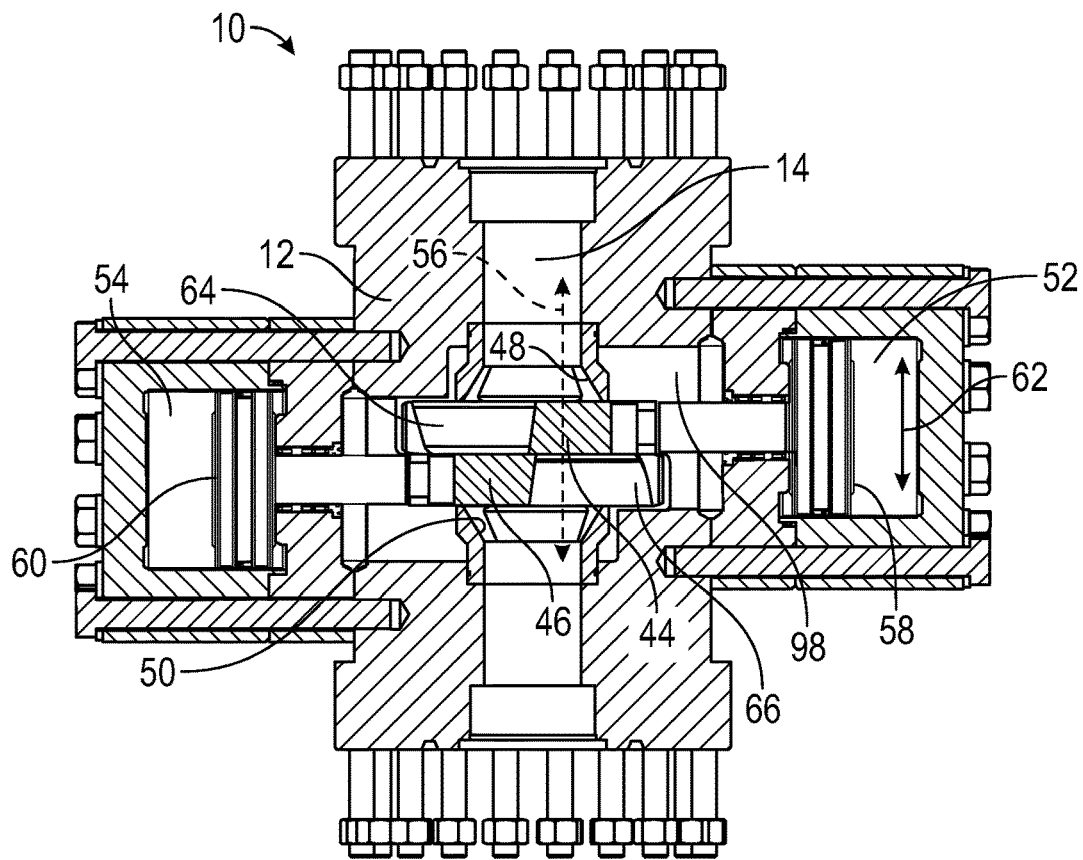
FIG. 2 is a front elevational view, in section, of a compact cutting system in the closed position in accord with one possible embodiment of the present invention.
Figure 3:
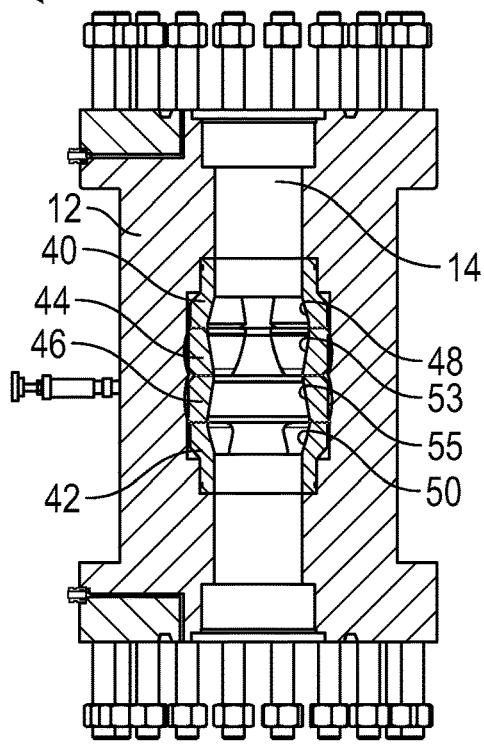
FIG. 3 is a side elevational view, in section, of a compact cutting system in accord with one possible embodiment of the present invention.
Figure 9:
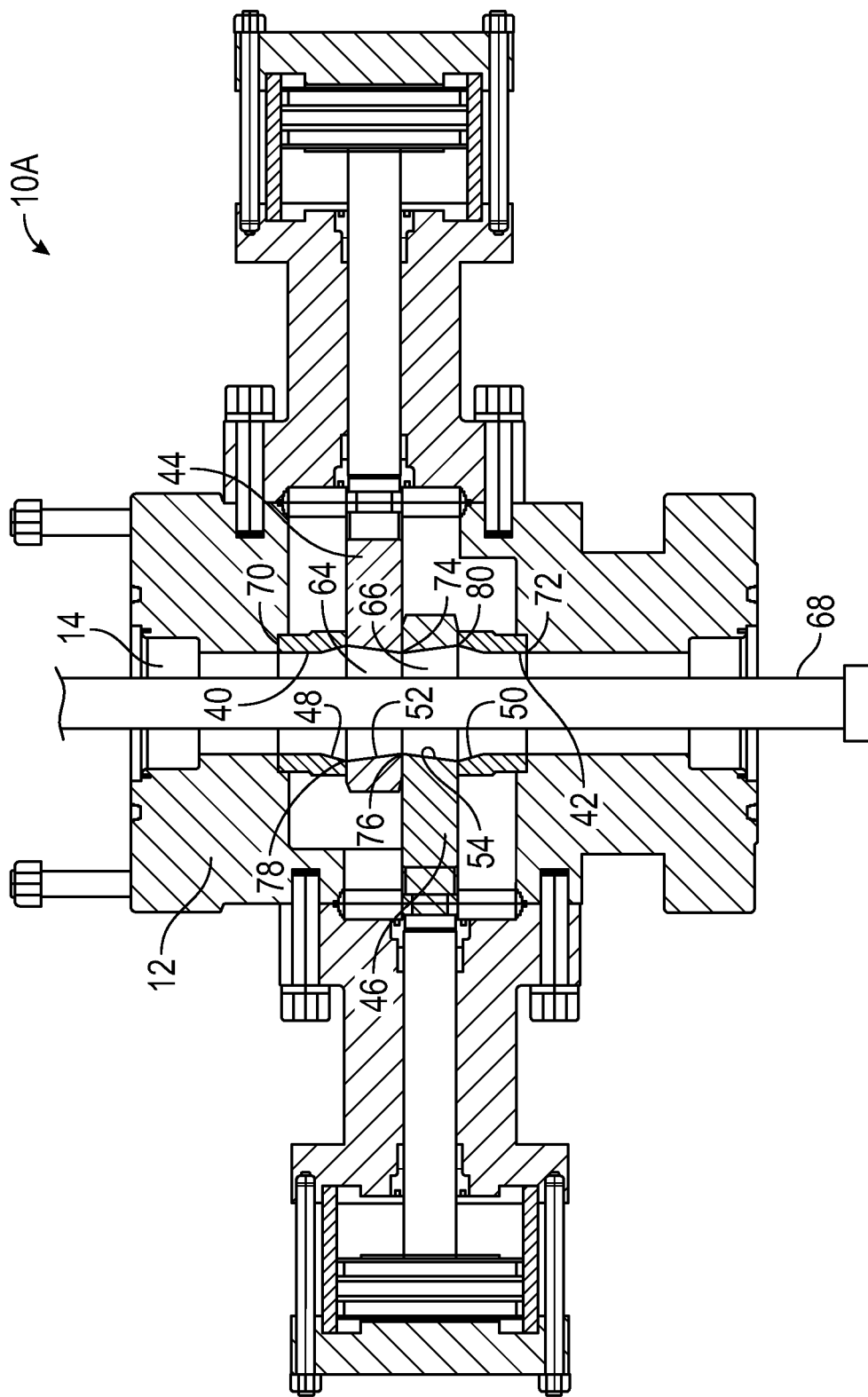
FIG. 9 is an elevational view of a cutter in accord with one possible embodiment of the present invention.

Cylinder housings 20 and 22 are utilized to house pistons 24 and 26, respectively, which drive piston rods 28 and 30 to move gates 44 and 46 between an open position and a closed position. FIG. 1, FIG. 3, and FIG. 9 show gates in an open or open throughbore position. FIG. 2 shows the gates in a closed position. As discussed below, in one possible embodiment moving the gates to the throughbore closed position does not necessarily provide a seal but instead in one embodiment fluid flow may occur past the gates. However, if desired, the gates could also be made to provide a seal when closed.

In one embodiment, stroke length 32 and 34 of the pistons is relatively short so as to be less than the diameter of throughbore 14. In one embodiment of a 7⅜ inch throughbore, the stroke length may be in the range of 5 inches. However, larger and smaller stroke lengths could be utilized. In one embodiment, compact cutting system CCD 10 advantageously utilizes considerably less volume of hydraulic fluid to operate in comparison to other units with cutting capability, e.g. a BOP. In one embodiment, the present invention utilizes less than 12 liters of hydraulic fluid for opening or closing the gates.

It will be noted that when CCD 10 is vertically oriented that piston 24, rod or piston rod 28, gate 44, and the axis of movement 36 of rod 28 is vertically higher than piston 26, rod 30, gate 46 and axis 38 of rod 30. Likewise, cylinder or piston housing 20 with associated bolts is vertically higher than piston housing 22 as shown in FIG. 1, FIG. 2, FIG. 5, and FIG. 9. The applied force is therefore directed along axis 36 and 38 of the pistons, piston rods and gates, which reduces bending forces acting on the piston rods 28 and 30 due to cutting forces applied by the gates, which are at different vertical heights.

In FIG. 2, valve cavity 98 can be irregularly shaped due to the different vertical heights of the components. In one embodiment, the diameter of the opening into housing 12 for the components used with each cylinder is almost the same diameter of the pistons and may be used for inserting the seats, gates, and other components.

Figure 4:
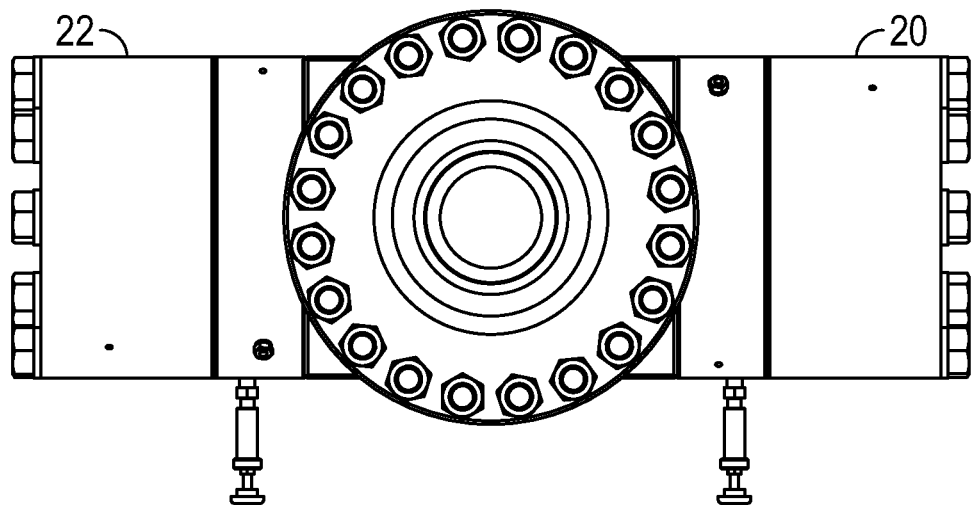
FIG. 4 is a top elevational view of a compact cutting system in accord with one possible embodiment of the present invention.
Figure 5:
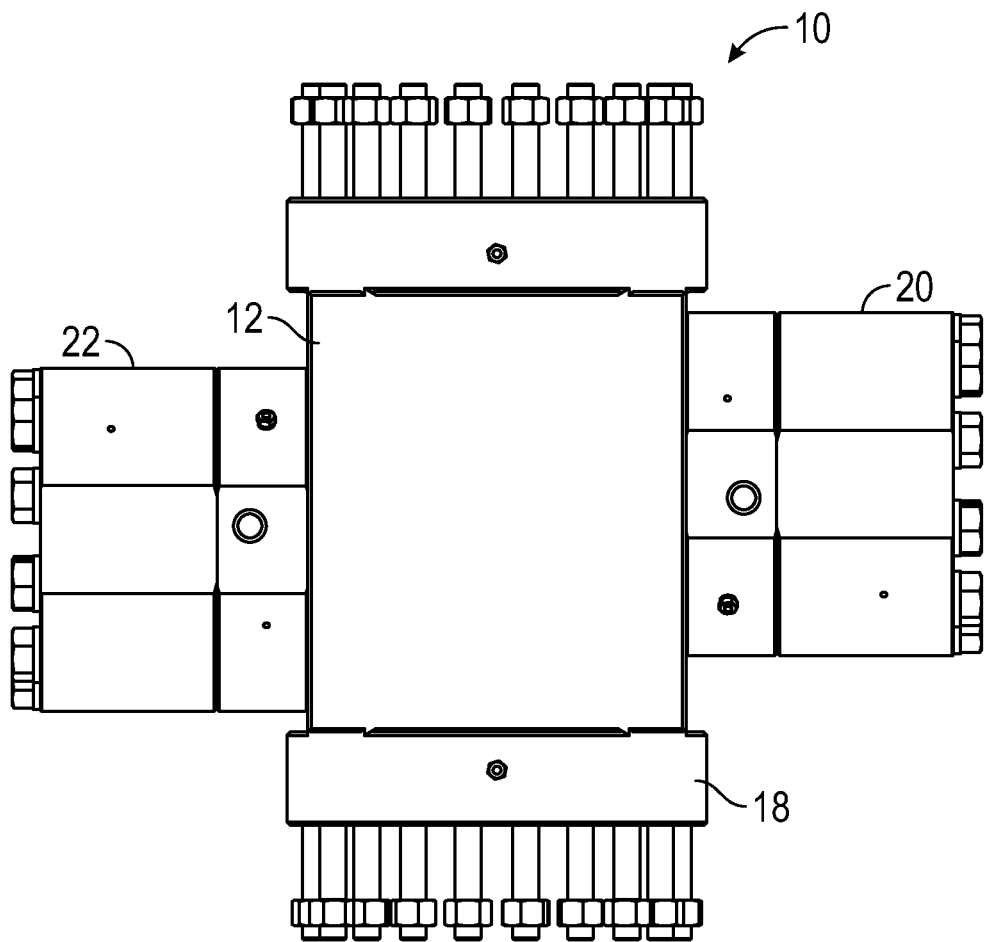
FIG. 5 is a front elevational view of a compact cutting system in accord with one possible embodiment of the present invention.

FIG. 4 shows the top elevational view whereby it can be seen that from an external view, cylinders 20 and 22 are aligned in top view, which may be considered the x-y plane. Accordingly, their associated pistons, piston rods, gates, piston axes are also aligned from this view. This is in contrast to FIG. 5, which shows that cylinder 20 is vertically higher than cylinder 22, which might be considered along a z-axis.

Referring again to FIG. 1, upper seat 40 and lower seat 42 are mounted in throughbore 14 in respective recesses in housing 12. Seats 40 and 42 may or may not seal with gates 44 and 46 when in the closed throughbore position. In one embodiment, referring to FIG. 2 that shows CCD 10 in the closed throughbore position, openings are formed in gates 44 and 46 that positively prevent sealing when in the closed position as indicated by flowpath 56 through the gates 44 and 46, which allows for fluid flow even in the closed or closed throughbore position. For example, slots may be milled into blank portions of gates 44 and 46 as shown in FIG. 7A and FIG. 7B at 65 and 67. In another embodiment, additional openings, passageways, or the like may be formed with in the gates.

In another embodiment, if desired, and which is not necessarily a preferred embodiment, one or both gates could be made to seal with seats 40 and 42, with a metal to metal seal.

FIG. 2 also shows hydraulic fluid volumes 52 and 54 that are filled with pressurized hydraulic fluid to move the gates to the closed position. It will be appreciated that the entirety of piston surfaces 58 and 60 can be utilized to create force to drive the cutters in the gates to cut drill pipe or the like within throughbore 14. In one embodiment, diameter 62 of piston surfaces 58 and 60 may be in the range of 1½ to 2½ times the diameter of throughbore 14. In another embodiment the diameter may be between 1% to 2 times the diameter of throughbore 14. In this way, a significant cutting force relative to pipe within throughbore 14 is produced, which allows the high speed powerful cutting. Use of surfaces 58 and 60 to create the force to drive the cutters takes advantage of the full surface of the pistons rather than using the side of the piston to which the piston rod is attached. Use of the piston rod side to drive the cutters would reduce the area on which the pressurized hydraulic fluid operates. Significant gate opening force is also available to open the gates by applying hydraulic fluid to the interior side of pistons 24 and 26. The piston rods connected to the interior size limit the force to some extent and in this embodiment may result in interior piston surfaces in the range of 132 square inches. Accordingly somewhat less hydraulic fluid is required for opening.

In one embodiment, the use of a shorter piston rod also helps produce a compact size for CCD 10. In one embodiment, piston rods 28 and 30 comprise a length less than 2¼ times the throughbore diameter and in another embodiment less than 2 times the throughbore diameter when measured from the inner surface of the piston to the end thereof.

As noted above, the cutting action is performed by moving the gates towards the wellbore so the full hydraulic piston surface area is used (not the rod end). This allows maximization of the performance and utilization of the hydraulic pressure available.

Using two gates 44, 46 causes the tool string to be centralized during the cut action rather than it being pushed to one side. The tool string is captured inside the two gate bores 64, 66 to provide crushing action to yield and cut the string in an area away from the upper and lower seats 40, 42. Gate bores 64, 66, comprise a minimum diameter of the throughbore, which in one embodiment is 7⅜ inches.

In one embodiment, the gate bores 64, 66 may be oval so that the minimum of 7⅜ is along one axis of the oval with the other axis of the oval being greater than the borehole diameter. Likewise, upper and lower seat 40, 42 may comprise an oval interior to match that of the gates.

Figure 6:
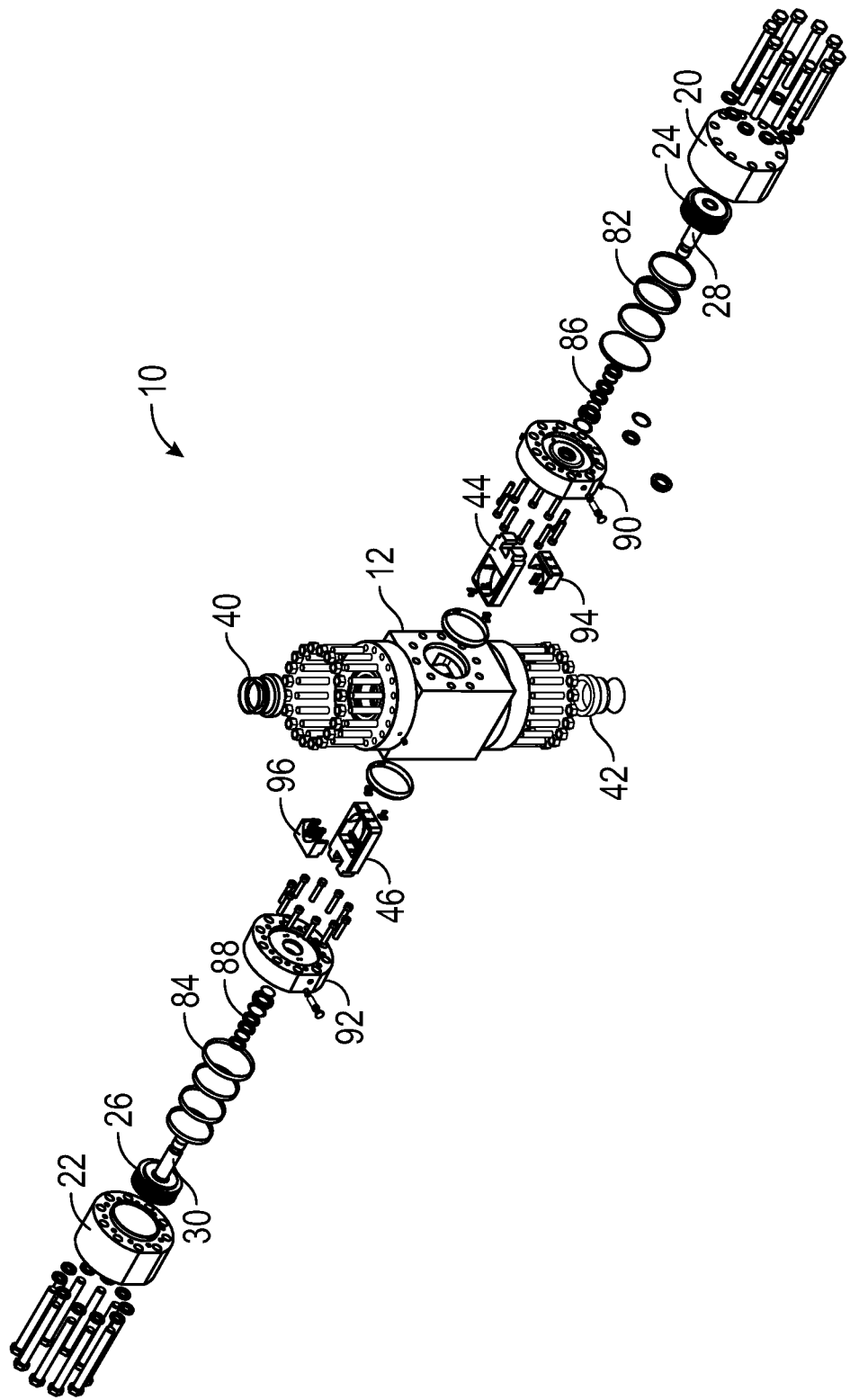
FIG. 6 is an exploded view of a compact cutting system in accord with one possible embodiment of the present invention.

FIG. 6 shows an exploded view of CCD 10, including piston seals 82, 84, piston rod seals 86, 88 and cylinder housing bases 90, 92. Other components have already been discussed but are shown here in a perspective view. It will be noted that external shapes of upper seat 40 and lower seat 42 as well as that of other components is shown.

FIG. 7A and FIG. 7B show enlarged views of gates 44 and 46 as well as cutter inserts 94 and 96. Gates 44 and 46 may or may not utilize cutter inserts such as cutter inserts 94 and 96. Utilizing cutter inserts 94, 96 allows the cutting surfaces to be changed out. Cutting face or surface 76 is shown in FIG. 7A. As discussed hereinbefore, gate openings or bores 64 and 66 preferably encircle throughbore 14 and drill pipe or the like within the throughbore when in the open position. In one embodiment openings or bores 64 and 66, with the corresponding cutter inserts 94, 96 are preferably circular or as shown in this embodiment, are oval. Openings 65, 67 and/or other openings can be milled into the gates, preferably in the blank portions of the gates, and utilized to provide that the gates do not seal with the seats and allow fluid flow through the throughbore in the closed position as discussed hereinbefore. However, if desired, the openings may not be used and the gates could seal with the seats. It will be noted that a T-slot connection can be used on the ends of the gate with corresponding T connector on the piston rods if desire.

In one embodiment, the replaceable cutting inserts 94 and 96 with taper angle at the cutting edge of the gates that surround the wellbore is unique. That the gates surround the wellbore is novel. The novel cutting inserts within the gates may or may not be used. If desired, hard facing or case hardening process may be used on the gates.

FIG. 8 shows a schematic of intervention package 100 that comprises CCD 10, which may be utilized with gate valve 102 in conjunction with subsea installation 104 in substitutions for a much heavier BOP in accord with one embodiment of the invention. CCD 10 may be utilized to cut 3½ in. 13.3 lb/ft Grade E-75 drill pipe without leaving any snag after cutting in accord with Table 18, API 16A/ISO 13533 and may be utilized to cut up to 4½ IN 16.60 lb/ft drill pipe. The use of CCD 10 in place of the much heavier BOP for use in an intervention package complies with codes and standards including:

API 6A, Specification for wellhead and Christmas tree equipment, 20th Edition, October 2010;

API 16A, Specification for Drill-through equipment, 3rd Edition, June 2004;

API 16D Control Systems for Drilling Well control Equipment, 2nd Edition, July 2004;

NORSOK D-002, Well intervention equipment, Revision 2, June 2013;

DNV-OS-E101, Drilling Plant, October 2013;

ISO 13533, Drilling and production equipment-Drill-through equipment, 1st Edition, December 2001;

API 17G, Recommended practice for completion/workover risers, 2nd edition, July 2006

NACE MR0175/ISO 15156, Petroleum and natural gas industries—materials for use in H2S—containing environments in oil and gas production, 2nd Edition, October 2009.

FIG. 9, which is another embodiment of a cutting system, namely cutting system 10A, shows bores or openings 64 and 66 in gates 44, 46 and pipe 68. Cutting system 10A utilizes longer cylinder rods and housing.

It will also be seen that gate opening 64 decreases in inner diameter with distance away from seat 40 as indicated by interior surface profile 52 until coming to cutting face 74 at the bottom of upper gate 44. Likewise, the inner diameter of gate opening 66 decreases with distance away from seat 42 as indicated by interior surface profile 54 until coming to a cutting face 76 at the top of lower gate 46. The changes in inner diameter of the bores or openings 64, 66 through the gates can also be seen in FIG. 1, FIG. 2, and FIG. 3.

In this embodiment, the interior or inner diameter of upper seat 40 decreases in diameter with distance away from gate 44 as indicated by interior surface profile 48. The interior of lower seat 42 also decreases in diameter with distance away from lower gate 46 as indicated by interior surface profile 50. The decrease in diameter of the upper and lower seats discussed above leads to the throughbore diameter at about the midpoint of the seats, which in one embodiment may be 7⅜ inches. In other words, both the seats and the gates comprise openings which are larger than the throughbore diameter in some regions and then either approach or are at the throughbore diameter, e.g. at the cutting faces and at the upper portion of upper seat 40 and the lower portion of lower seat 42. The minimum diameter is the throughbore diameter. As discussed above, both the interior of the seats and the gates may be oval.

Upper seat seal surface 70 is recessed into housing 12 and seals with upper seat 40. Lower seat seal surface 72 is recessed into housing 12 and seals with lower seat 42. Face 78 is provided between first gate 44 and seat 40. Face 80 is provided between second gate 46 and seat 42. As discussed hereinbefore, in one embodiment the seats do not seal off throughbore 14 even when the gates are in the closed position. However, if desired, a metal to metal seal could be provided at face 78, 80 to seal off throughbore 14 with the gates in the closed position.

In one embodiment, CCD 10 is operable to cut pipe 68 which may comprise 3½ in 13.3 lb/ft Grade E 75 drill pipe (Table 18, API 16A/ISO 13533) or 4½ 16.60 lb/ft drill pipe.

Figure 10:
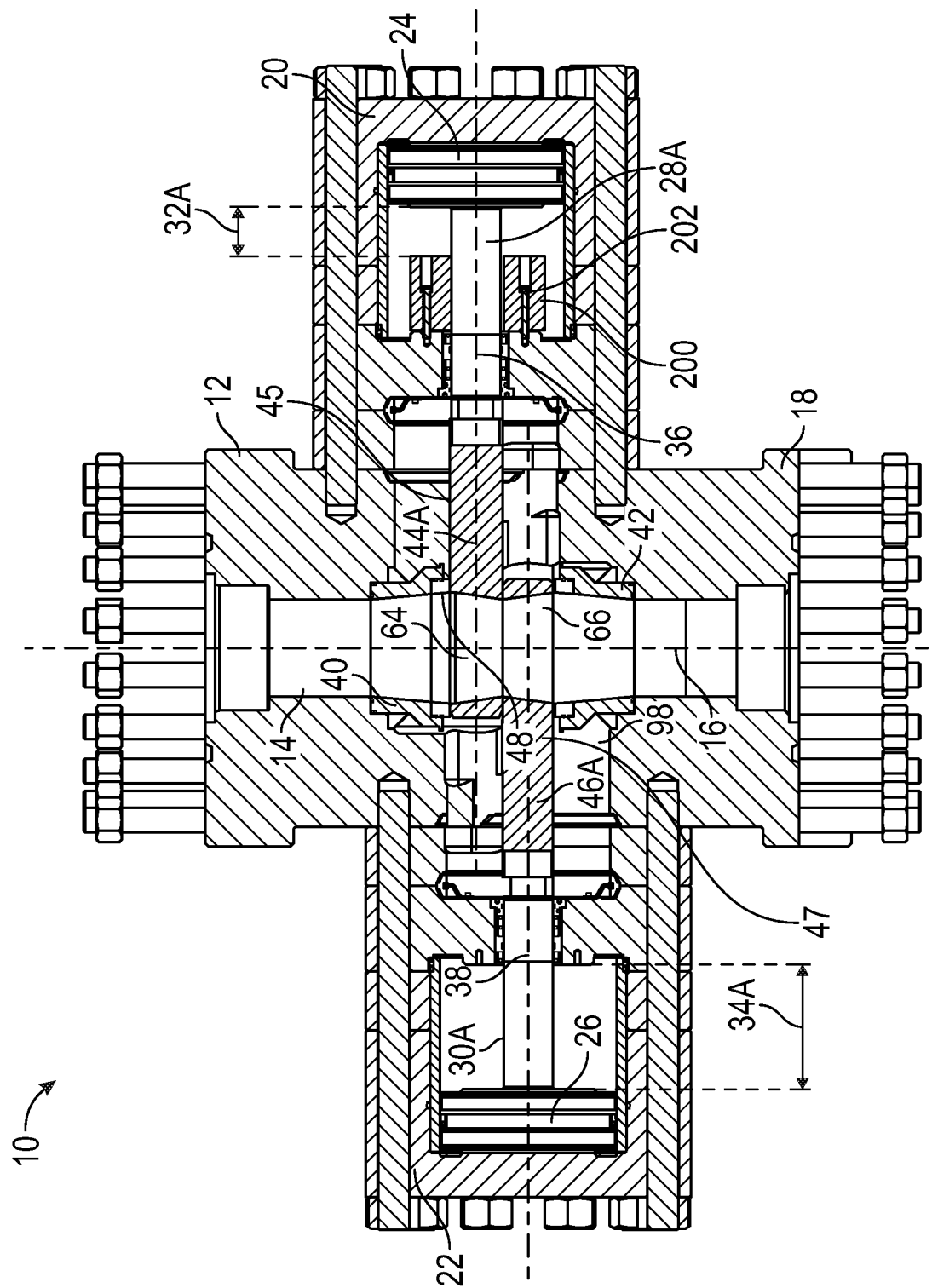
FIG. 10 is a front elevational view, in section, of a compact cutting system with both gates in the open throughbore position in accord with one possible embodiment of the present invention.
Figure 11:
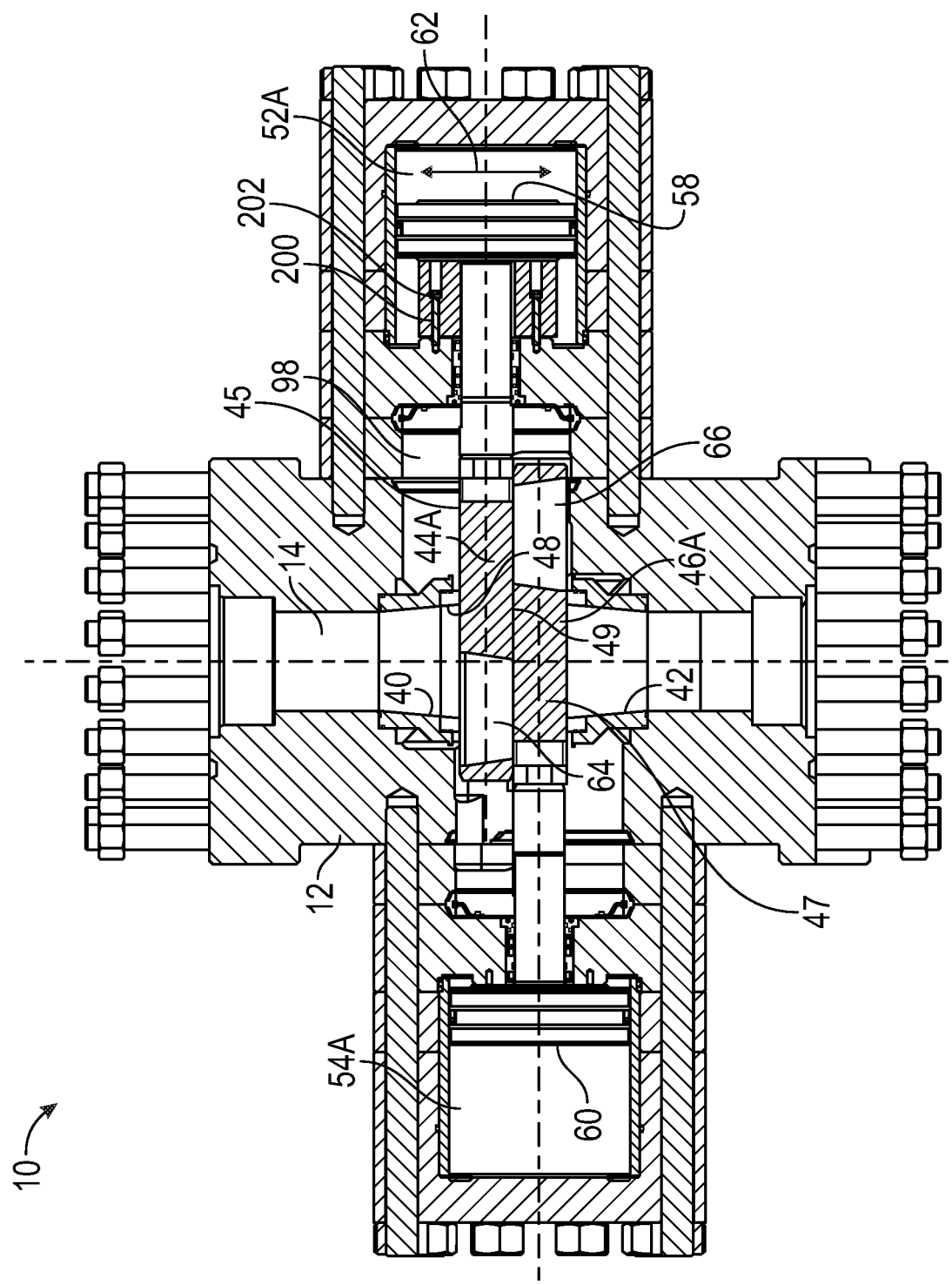
FIG. 11 is a front elevational view, in section, of a compact cutting system with one gate in a closed throughbore position and the other gate in a partially open throughbore position that allows centering the pipe, cutting the pipe, and sealing the borehole in accord with one possible embodiment of the present invention.

Referring now to FIG. 10 and FIG. 11, there is shown another possible embodiment of a compact cutting device CCD 10. In FIG. 10, the gates 44A and 46A are in an open throughbore position, offset from throughbore 14. Housing 12 defines throughbore 14 with axis 16. Each gate comprises an opening or bore 64, 66 and a blank portion 45, 47 and the gates preferably slide with respect to each other along a preferably smooth interface 49 (see FIG. 11). However, in one embodiment as described below the blank portion 45 of gate 44A is moved only halfway across the throughbore to a position that does not seal the throughbore (see FIG. 11) while being positioned to center and cut the pipe efficiently. On the other hand, the blank portion 47 of gate 46A is moved across the throughbore to a position to seal the throughbore after the cut. The interface 49 between gate 44A and 46A is smooth and allows the gates to slide with respect to each other.

Cylinder housings 20 and 22 are utilized to house pistons 24 and 26, respectively, which drive piston rods 28A and 30A. In this embodiment, only gate 46A is moved to a throughbore closed position as shown in FIG. 11. Gate 44A does not move to a closed throughbore position but is moved to a partially open position as shown in FIG. 11 with the blank portion 45 of the gate only part way through the bore. In this position, the pipe is centered and cut. In one embodiment, gate 46A seals with the seat 42 to seal off the throughbore as shown in FIG. 11. In FIG. 11, gate 44A is in a partially open position with blank portion 45 limited to move only about halfway across the wellbore or throughbore 14 and therefore does not seal with seat 40 to seal off the throughbore. However, gate 44A is positioned to efficiently center the pipe during cutting. Gate 44A does this since the stroke length places the cutting edge at the centerline of the bore 14.

Within cylinder housing 20, stroke adjustment spacer 200, which may also be called stroke adjustment section or member, is mounted between the inner surface of piston 24 and throughbore 14. Stroke adjustment spacer 200 may be secured within the piston chamber using bolts 202 or other like means. Stroke adjustment spacer 200 may be of any thickness to adjust the overall stroke length 32A (FIG. 10) of piston 24 within the cylinder to the desired length as necessary depending on the application. The stroke length 34A (FIG. 10) of piston 26 is unaffected. However in one embodiment, the width of stroke adjustment spacer 200 results in gate 44A being positioned so that the cutting element is centrally located as seen in FIG. 11 and discussed hereinafter.

In one possible embodiment, stroke adjustment spacer 200 may extend laterally from the cylinder wall to reduce the stroke length of gate 44A to approximately one half that of stroke length 34A. Therefore, piston 24 and gate 44A moves only a limited length to a specific position within throughbore 14, which does not close the borehole but does centrally locate the cutting element in gate 44A. It will be appreciated that piston chamber 52A is smaller than piston chamber 54A so that less hydraulic fluid is used to operate CCD 10. It will be noted that piston chambers 52A, 54A are on the opposite sides of the respective pistons from gates 44A, 46A.

Accordingly in one possible embodiment, gate 44A is moved so that the cutter insert 94 (See FIG. 7B) is centralized, which ensures centralized cutting. It will be appreciated that the cutter inserts 94 and 96 or permanent cutters are used in the gates 44A and 46A. In this embodiment only gate 46A is moved to a throughbore closed position to seal off the wellbore. So the gates 44A and 46A operate asymmetrically with gate 46A blank portion 47 moving across wellbore 14 and 44A and blank portion 45 not closing off wellbore 14. It is not required that both gates close off the wellbore to cut pipe that extends therethrough while the pipe is centered.

While adjustment spacer 200 is utilized herein so that one gate is moved only to a partially open position, it will be appreciated that the stroke length may be adjusted using a smaller piston chamber, a shorter piston rod, a shortened gate or the like. Thus any of these elements may be referred to as a stroke adjustment member.

In this embodiment, one piston rod is limited in movement by stroke adjustment spacer 200 while the other piston moves the entire stroke length unimpeded. As shown, stroke length 32A (FIG. 10) has been decreased in lateral movement by stroke adjustment spacer 200 while stroke length 34A (FIG. 10) may move the entire length of the cylinder. Accordingly, the blank portion of gate 46A is moved to a throughbore closed position while gate 44A moves to a partially open position.

In one embodiment, compact cutting system CCD 10 advantageously utilizes less volume of hydraulic fluid to operate in comparison to other embodiments of the invention.

It will be noted that when CCD 10 is vertically oriented so that piston 24, piston rod or rod 28A, gate 44A, and the axis of movement 36 of rod 28A is vertically higher than piston 26, rod 30A, gate 46A and axis 38 of rod 30A. Likewise, piston housing 20 with associated bolts is vertically higher than piston housing 22. The applied force is therefore directed along axis 36 and 38 of the pistons, piston rods and gates, which reduces bending forces acting on the piston rods 28A and 30A due to cutting forces applied by the gates, which are at different vertical heights. However if desired, the axis of both the rods and corresponding components except for the gates could be the same.

Upper seat 40 and lower seat 42 are mounted in throughbore 14 in respective recesses in housing 12.

In this embodiment, only the blank portion of gate 46A seals with seat 42, while the blank portion of gate 44A does not seal with seat 40.

Figure 12:
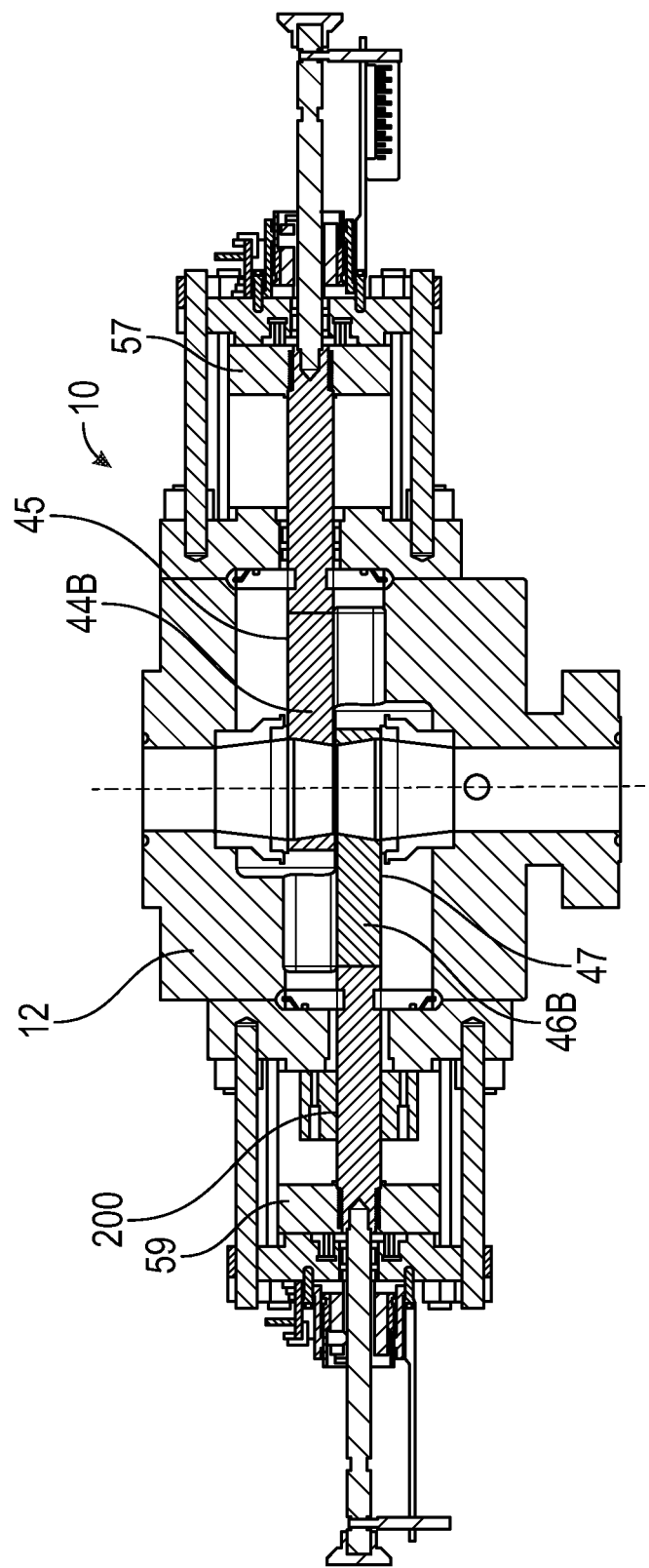
FIG. 12 is a front elevational view, in section, of a compact cutting system with one gate in a closed throughbore position and the other gate in a partially open throughbore position that allows centering the pipe, cutting the pipe, and sealing the borehole in accord with one possible embodiment of the present invention.

FIG. 12 shows another example wherein gate 44B and blank portion 45 is utilized to seal off the wellbore. Gate 46B moves only halfway across the wellbore due to either a shorter chamber or by use of spacer 200, which shortens the travel of gate 46B by limiting movement of piston 59. In this example, gate 46B is able to center the pipe at the center of the borehole during cutting. Gate 44B and piston 57 are unrestricted in movement and therefore have a longer stroke length than gate 46B associated piston 59

Accordingly, the present invention provides a compact cutting system or device. The hydraulic fluid utilized in this embodiment is reduced. In one embodiment to provide a 7⅜ throughbore, the compact cutting system or device may be in the range of 40 to 50 inches in height, in the range of 65 to 75 inches at maximum width, and with a diameter in the range of 20-25 inches, with a weight in the range of 11,000 to 12,000 pounds or less than 30,000. In this embodiment, the stroke of the two gates is different so that the gates operate asymmetrically.

The present invention provides a subsea compact cutting system. The subsea compact cutting system comprises a housing that defines a throughbore. A first gate and a second gate are mounted within the housing. The first gate is moveable only between an open throughbore position and a partially open throughbore position that does not prevent fluid flow. However, the second gate is moveable between an open throughbore position and a closed throughbore position whereby when the second gate is in the closed throughbore position then the throughbore is sealed to prevent fluid flow through the throughbore.

The first gate comprises a first gate cutting element and the second gate comprises a second gate cutting element so that when the first gate is in the partially open throughbore position and the second gate is in the closed throughbore position and a pipe is present in the throughbore then the pipe is cut.

Figure 13:
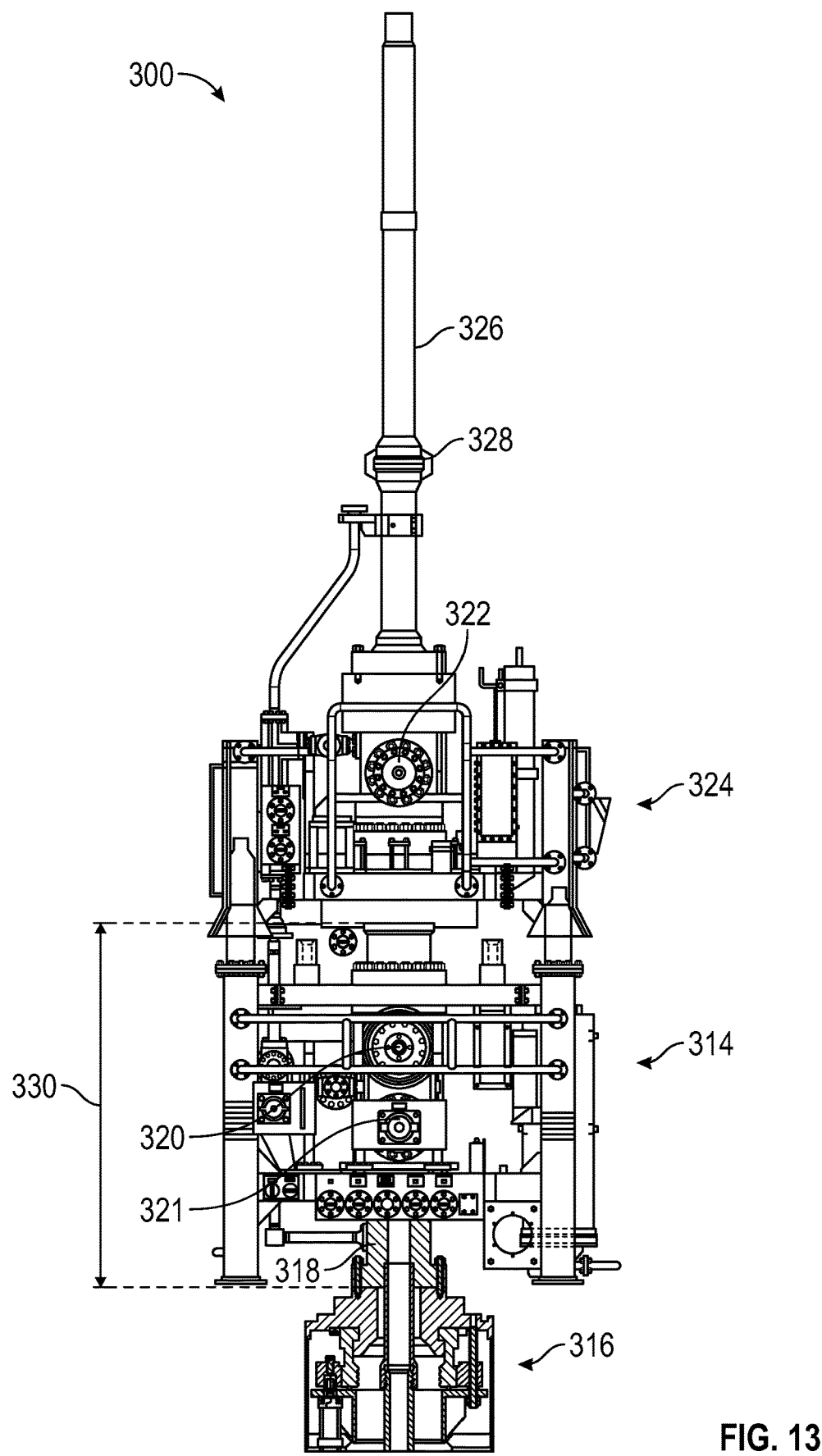
FIG. 13 is a diagram of a dual compact cutting intervention system in accord with one possible embodiment of the present invention.

Turning to FIG. 13, one embodiment of a Dual Compact Cutting Intervention System 300 is shown. Two CCDs in the system will eliminate the requirement for any ram type BOPs, as the additional compact cutting device will replace the functionality of the blowout preventer, and allow for a more efficient and lightweight system, as discussed hereinbefore in FIG. 8. The CCD is not Ram type design, but rather gate valve technology. There is no regulation requirement that specifies the mandatory use of ram type BOPs in the system, but only the use of a Safety Head, which includes shear/seal rams, like the CCD. One CCD may be utilized to provide a shearing or cutting function whereby the gates do not seal with the seats and allow fluid flow through the throughbore in the closed position as discussed hereinbefore, while the other CCD replaces the much heavier BOP. Therefore, a dual compact cutting intervention system complies with NORSOK D-002, Well intervention equipment, Revision 2, June 2013, for minimum standards for well control equipment. While two CCDs is the preferred embodiment, only one CCD is used in some cases.

Intervention package 300 is used for subsea applications and may be used in deep water including depths up to and beyond 5000 or 10000 feet or more.

Lower riser package 314 is connected to wellhead 316 using crossover spool 318. Lower riser package 314 may comprise lower CCD 320 and CCD 321. However, valve 320 may also comprise a valve cutter as shown U.S. Pat. No. 6,601,650, which is incorporated by reference. Unlike the CCD, the valve cutter can cut pipe using only a single gate and single drive shaft. Representative CCDs have been discussed and shown hereinbefore. As indicated by line 330, lower riser package 314 has a height of about eight and one-half feet and may comprise a height of less than fifteen feet, or less than ten feet or any height from about eight feet to fifteen feet.

Emergency disconnect package 324 may comprise a valve cutter 322 or another CCD. Riser package 300 connects to riser 326 at connector 328. Upper riser package from the top of line 330 to connector 328 has a height of about 11 feet and may comprise a height less than 15 feet. So the total height of riser package 300 from the bottom of line 330 to connector 328 is about twenty feet. So riser package 300 is very compact and is less than twenty five feet or less than thirty feet or any distance in between.

If necessary, emergency disconnect package 324 can be separated from lower riser package 314 and lower riser package 314 can utilize lower CCD 320 and/or CCD 321 to seal the well. Either or both CCDs can be used to cut pipe or seal the wellbore. In some cases, the upper valve cutter 322 may cut and seal as disclosed in U.S. Pat. No. 6,601,650, which is incorporated by reference. Upper valve cutter 322 as described in U.S. Pat. No. 6,601,650 may comprise a valve cutter that cuts using a single gate rather than the two gates to cut pipe.

For this reason, it is not necessary to provide a Ram type BOP. Other advantages include a smaller size, less hydraulic fluid, less costly installation due to smaller size and lower weight, simplified construction, decreased materials, and decreased manufacturing costs. For purposes herein, Ram type BOPs that comprise two rams that in the open position are positioned on opposite sides of the wellbore, and in the closed position move into the throughbore of the BOP and engage each other. These would typically be shear rams that are able to cut pipe therein. A BOP as defined herein comprises a bore and two rams mounted on opposite sides of said bore in an open position, said two rams being moveable towards each other to engage each other within said bore in a closed position.

Figure 14:
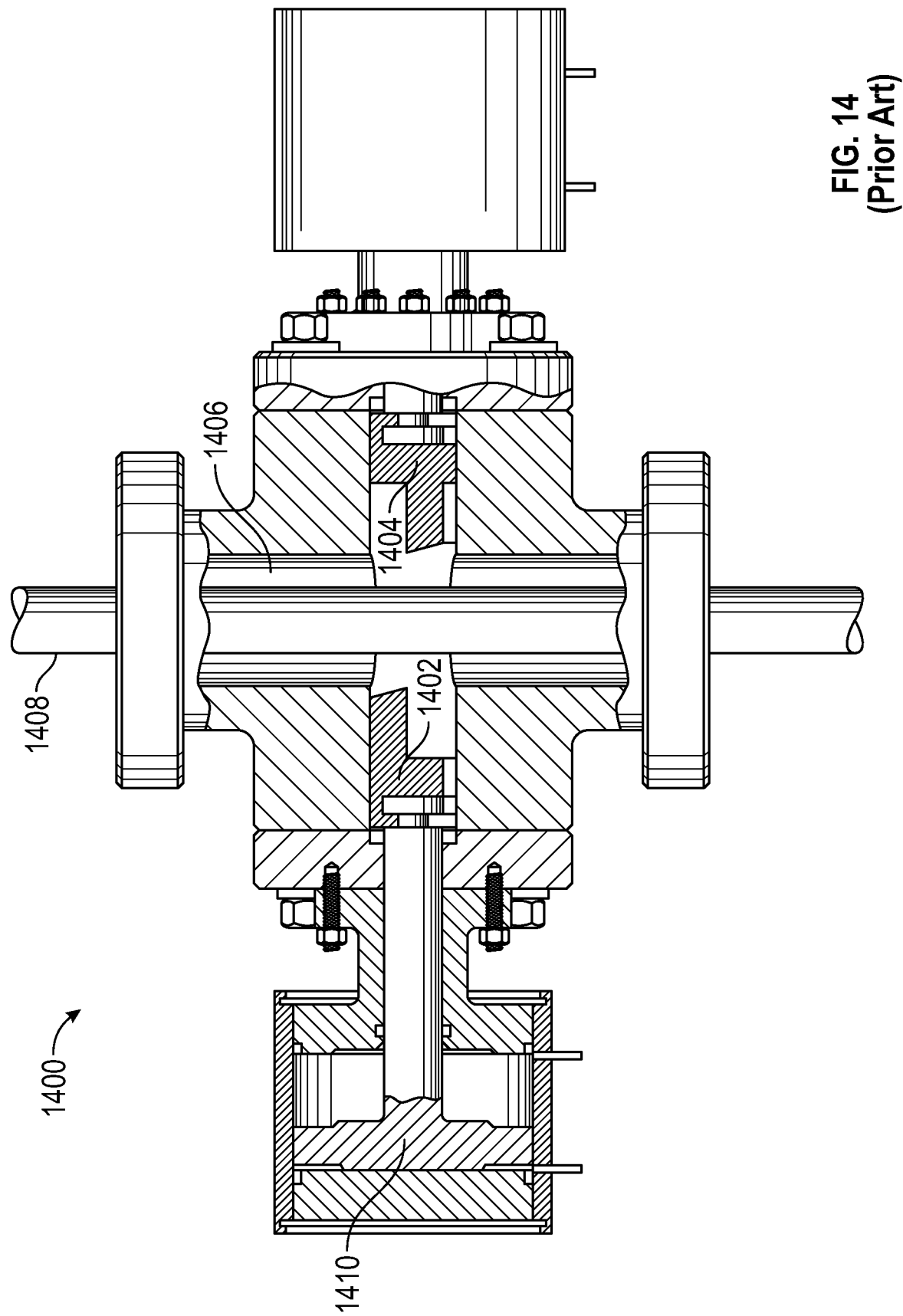
FIG. 14 is an elevational view, partially in section, of a prior art Ram that is part of a BOP.

FIG. 14 shows a typical prior art BOP 1400 comprising cutters 1402 and 1404. In the open position as shown, the two cutters are on opposite sides with respect to throughbore 1406. In the closed position, the two cutters or rams engage each other in the throughbore 1406 to cut pipe 1408 and seal the throughbore. The two cutters are driven by two identical pistons such as piston 1410. BOPs are heavy and large. By avoiding use of a BOP, the present invention provides a lightweight and compact intervention package.

The description is for illustration only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. An intervention package for servicing a subsea well through a riser, said intervention package comprising:
   a lower riser package connectable to said subsea well;
   an emergency disconnect package comprising an upper connector mountable to said riser and comprising a lower connector secured to said lower riser package;
   said emergency disconnect package being separable from said lower riser package at said lower connector;
   a compact cutting device mounted on said lower riser package, said compact cutting device comprising:
      a body defining a throughbore through said body, said throughbore being operable to receive a pipe, two gates mounted in said body, each gate comprising a blank portion and an opening, said two gates being continuously slidable with each other between an open position and a closed position, in said closed position said two gates cooperating to cut said pipe when said pipe is present, in said open position each said opening being aligned with said throughbore, each said gate being connected to a piston through a piston rod, each said piston rod being connected to each said gate so that said blank portion is closer to said piston rod than said opening, a piston chamber for each said piston, an outermost region of each said piston chamber on an opposite side of each said piston from each said gate, said outermost region of each said piston chamber being expandable as each said piston moves toward said throughbore to said closed position, said outermost region of each said piston chamber being contractable as each said piston moves away from said throughbore to an open position.

2. The intervention package of claim 1, further comprising a second compact cutting device mounted on said lower riser package, said intervention package being constructed without a blowout preventer (BOP) comprising a BOP throughbore and two cutters moveable between an open position and a closed position, in said open position said two cutters being disengaged from each other and positioned on opposite sides of said BOP throughbore, in said closed position said cutters engaging each other in said BOP throughbore.

3. The intervention package of claim 1, wherein said compact cutting device weighs less than 12000 pounds.

4. The intervention package of claim 1, wherein said intervention package is less than twenty five feet in height from a connection to said subsea well beneath said lower riser package to a connection to said riser above said emergency disconnect package.

5. The intervention package of claim 1, wherein said lower riser package comprises a height less than ten feet.

6. The intervention package of claim 1, wherein said two gates comprise:
   a first gate and a second gate mounted within said body, said first gate being positioned vertically adjacent to said second gate when said throughbore is vertically oriented; and
   said first gate being moveable only between an open throughbore position and a partially open throughbore position.

7. The intervention package of claim 6, further comprising;
   said second gate being moveable between an open throughbore position and a closed throughbore position so that when said second gate is in said closed throughbore position then said throughbore is sealed to prevent fluid flow through said throughbore, a first stroke length of said first gate being shorter than a second stroke length of said second gate; and
   said first gate and said second gate being moveable with respect to each other, a first opening in said first gate and a second opening in said second gate, in said throughbore open position said first opening and said second opening receive said pipe when said pipe is present in said throughbore, when said first gate is moved to said partially open throughbore position and said second gate is moved to said closed throughbore position then said pipe is cut.

8. The intervention package of claim 7, wherein when said first gate is in said partially open throughbore position then a cutting surface within said first opening of a first gate cutting element is centralized in said throughbore.

9. The intervention package of claim 7, further comprising a first seat and a second seat, when said second gate is in said closed throughbore position, then said second gate and said second seat operate to form a seal to prevent fluid flow through said throughbore.

10. The intervention package of claim 9, wherein when said first gate is moved to said partially open throughbore position, said first gate and said first seat do not prevent fluid flow through said throughbore.

11. A method for providing an intervention package for servicing a subsea well through a riser, said intervention package comprising:
providing a lower riser package connectable to said subsea well;
providing an emergency disconnect package comprising an upper connector mountable to said riser and a lower connector secured to said lower riser package;
providing said emergency disconnect package being separable from said lower riser package;
mounting a compact cutting device on said lower riser package, said compact cutting device comprising:
providing a body defining a bore through said body, said bore being operable to receive a pipe, two gates mounted in said body, each gate comprising a blank portion and an opening, said two gates being continuously slidable with each other between an open position and a closed position, in said closed position said two gates cooperating to cut said pipe when said pipe is present, each said gate being connected to a piston, said opening comprising a proximal side closer to said piston than a distal side of said opening further from said piston, a cutting surface on said blank portion at said proximal side of said opening; and
constructing said intervention package without a blowout preventer (BOP) comprising a throughbore and two cutters moveable between an open position and a closed position, in said open position said two cutters being disengaged from each other and positioned on opposite sides of said throughbore, in said closed position said cutters engaging each other in said throughbore.

12. The method of claim 11, further comprising mounting a second compact cutting device on said lower riser package.

13. The method of claim 11, wherein said compact cutting device weighs less than 12000 pounds.

14. The method of claim 11, further comprising providing said intervention package is less than twenty five feet in height from a connection to said subsea well beneath said lower riser package to a connection to said riser above said emergency disconnect package.

15. The method of claim 11, further comprising providing said lower riser package comprises a height less than ten feet.

16. The method of claim 11, further providing said two gates comprising
a first gate and a second gate mounted within a housing of said compact cutting device, said housing defining said throughbore, positioning said first gate vertically adjacent to said second gate when said throughbore is vertically oriented; and
providing said first gate being moveable only between an open throughbore position and a partially open throughbore position.

17. The method of claim 16, further comprising providing said second gate being moveable between an open throughbore position and a closed throughbore position so that when said second gate is in said closed throughbore position then said throughbore is sealed to prevent fluid flow through said throughbore, a first stroke length of said first gate being shorter than a second stroke length of said second gate; and
providing said first gate and said second gate being moveable with respect to each other, providing a first opening in said first gate and a second opening in said second gate, in said throughbore open position said first opening and said second opening receive said pipe when said pipe is present in said throughbore, when said first gate is moved to said partially open throughbore position and said second gate is moved to said closed throughbore position then said pipe is cut.

18. The method of claim 17, further comprising providing a first seat and a second seat, when said second gate is in said closed throughbore position, then said second gate and said second seat operate to form a seal to prevent fluid flow through said throughbore.

19. The method of claim 18, further providing when said first gate is moved to said partially open throughbore position, said first gate and said first seat do not prevent fluid flow through said throughbore.

20. The method of claim 16, further providing when said first gate is in said partially open throughbore position then said a cutting surface is centralized in said throughbore.

* * * * *